March 22, 1966 — E. V. BUNTING — 3,241,862
TRACTOR DRAWBAR ATTACHMENT
Filed Aug. 14, 1963 — 2 Sheets-Sheet 1
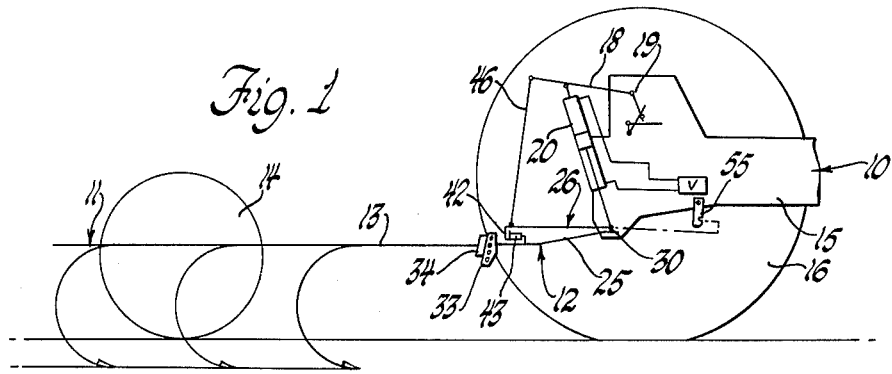
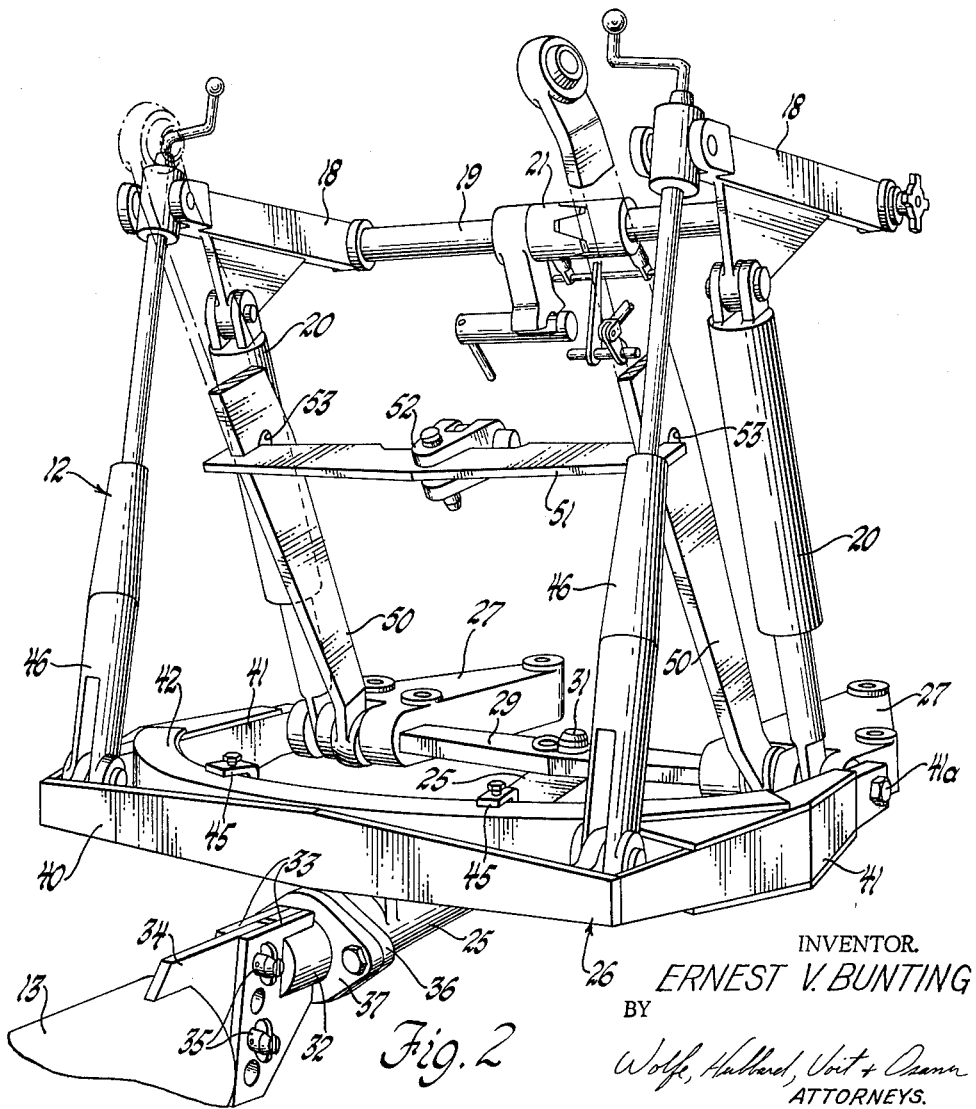
INVENTOR.
ERNEST V. BUNTING
BY
Wolfe, Hubbard, Voit & Osann
ATTORNEYS.

March 22, 1966  E. V. BUNTING  3,241,862
TRACTOR DRAWBAR ATTACHMENT
Filed Aug. 14, 1963  2 Sheets-Sheet 2
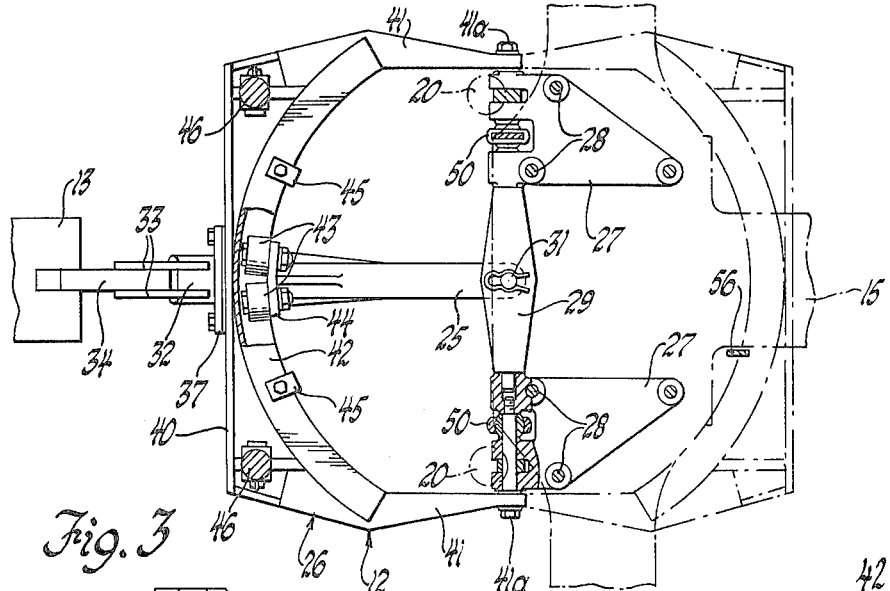
Fig. 3
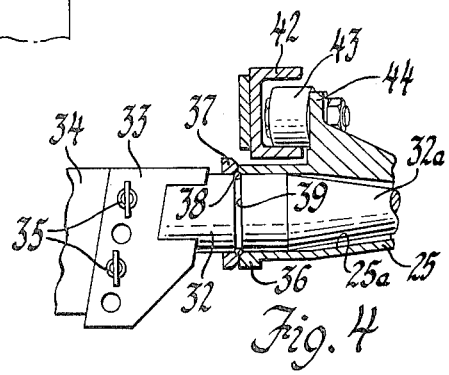
Fig. 5
Fig. 4
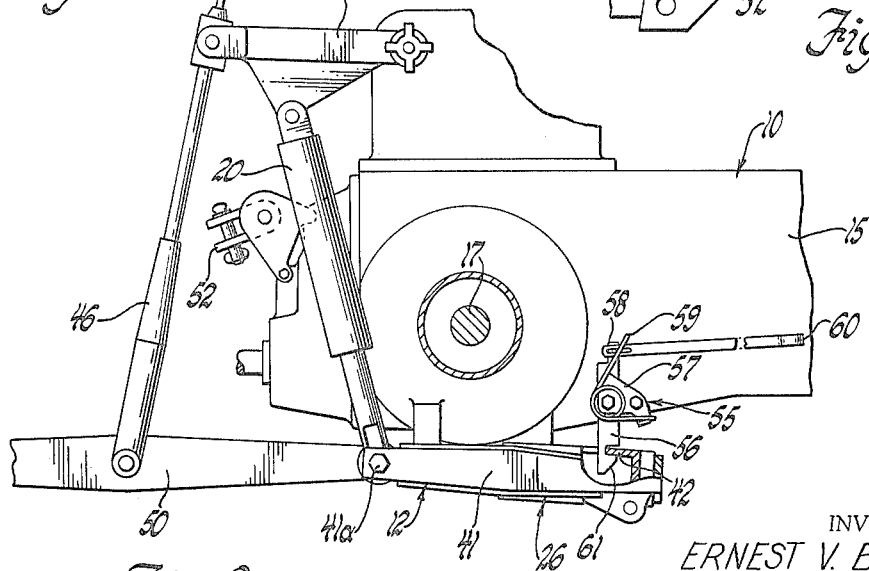
Fig. 6
INVENTOR.
ERNEST V. BUNTING
BY
Wolfe, Hubbard, Voit & Osann
ATTORNEYS.

United States Patent Office 3,241,862
Patented Mar. 22, 1966

3,241,862
TRACTOR DRAWBAR ATTACHMENT
Ernest V. Bunting, Detroit, Mich., assignor to Massey-Ferguson Inc., Detroit, Mich., a corporation of Maryland
Filed Aug. 14, 1963, Ser. No. 302,132
8 Claims. (Cl. 280—490)

This invention relates to agricultural tractors and more particularly concerns a drawbar attachment for such tractors.

The art has long been familiar with the "Ferguson system" for mounting implements on a tractor with a power lift arrangement so as to achieve draft control and transfer of implement weight and suction forces to the rear drive wheels of the tractor. As those skilled in the art appreciate, the weight transfer function permits a light tractor to do the work of a much heavier unit.

In recent years, tractors have become more powerful and implements wider and heavier. The increased size and weight of implements has made it difficult to mount them on the traditional hitch linkages and, as a result, the semi-mounted implement has come into being. In such an arrangement, a selectable amount of implement weight and suction is transferred through the tractor power lift to the rear drive wheels, while the remainder of the implement load is borne by implement ground wheels. Such a partial weight transfer arrangement is also very useful with mounted implements having depth gauge wheels. This pressure control concept also makes it possible to utilize the full power of a light tractor when a drawbar connection is used, since the power lift can act on the drawbar to transfer weight to the rear drive wheels of the tractor. The present invention concerns this concept of pressure controlled weight transfer with a drawbar connection between a tractor and a trailing implement or vehicle.

The general aim of the invention is to provide a tractor drawbar attachment for establishing a close coupling between the tractor and trailing ground supported units that gives a vertically rigid connection between the drawbar for the unit and the tractor power lift. More particularly, it is an object to provide an attachment of this kind which permits uniform weight transfer from a trailing implement drawbar to the tractor rear wheels whether the tractor and trailing unit is turning or moving in a straight line.

Another object is to provide an attachment as characterized above that produces smooth, close tracking of the tractor by the trailing unit, with there being little effect on the tractor steering when turns are made even with high drawbar and weight transfer loadings.

A further object is to provide an attachment of the above type which is self-storing on a tractor and which permits the same power life linkage used for conventional draft link implement mountings to be employed for drawbar weight transfer.

It is yet another object to provide a drawbar attachment as referred to above having a rugged, but economical, construction well suited for mass manufacture and capable of long service life.

Other objects and advantages of the invention will become apparent upon reading the following detailed description and upon reference to the drawing, in which:

FIGURE 1 is a schematic side elevation of a tractor and implement combination utilizing a drawbar attachment embodying the present invention;

FIG. 2 is a fragmentary perspective of an attachment of the type diagrammed in FIG. 1;

FIG. 3 is a horizontal section of the attachment shown in FIG. 2 with dashed lines showing both the rear portion of the tractor body and an alternate position for an element of the attachment;

FIG. 4 is an enlarged, fragmentary section of the tractor-implement connection shown in the above figures;

FIG. 5 is a further enlarged portion of the structure shown in FIG. 4; and

FIG. 6 is a side elevation with portions broken away of the attachment shown in FIG. 2 with the parts positioned for an alternate mode of operation corresponding to the dashed line showing in FIG. 3.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning now to the drawings, there is shown in FIG. 1 the rear end of a tractor 10 coupled to an implement 11 by a drawbar attachment 12 embodying the invention. The exemplary implement includes a forwardly extending tongue 13 and a supporting ground wheel 14. The portion of the tractor 10 illustrated includes a body 15 supported by rear drive wheels 16, only one of which is shown, that are powered by axles 17, only one of which is shown (see FIG. 6). A power lift mechanism is embodied in the tractor 10 which includes a pair of lift arms 18 pivoted on a rock shaft 19 journalled in the tractor body. The lift arms are powered by a pair of hydraulic actuators 20 which are respectively coupled to the undersides of the lift arms. The rock shaft 19 is formed in two portions which are releasably coupled by a connection 21. While this description will be sufficient for an understanding of the present invention, further details of a power lift mechanism of this type may be had by reference to Bunting et al. application Serial No. 253,685, filed Jan. 24, 1963.

Pursuant to the invention, the attachment 12 includes a drawbar 25 pivoted on the tractor body 15 and secured in rigid alinement to the implement tongue 13, with there being a frame 26 providing a lifting connection between the lift arms 18 and the drawbar 25 that does not interfere with the free pivotal movement of the drawbar. In the preferred construction, a pair of brackets 27 are affixed by bolts 28 to the underside of the tractor body 15, a cross piece 29 is pivoted between the brackets 27 for rotation about a transverse axis 30 (see FIG. 1), and the drawbar 25 is pivoted by a bolt 31 to the cross piece 29 for side-to-side swinging movement. The drawbar 25 can thus swing up and down about the transverse axis 30 by rotating the cross piece 29, and the drawbar also swings from side to side about the pivot bolt 31.

For securing the drawbar 25 and the implement 13 in rigid alinement, while allowing transverse tilting of the implement, the rear end of the drawbar is formed with a cylindrical socket 25a formed to receive a shaft 32 carrying a pair of spaced plates 33 that sandwich a plate 34 fixed to the end of the tongue 13. A plurality of pins interconnect the plates 33, 34. The shaft 32 is releasably locked in the socket 25a by a snap ring 38 which is locked between a plate 37 and an end flange 36 formed on the drawbar 25. The plate 37 is bolted to the flange 36 and respective tapered faces 36a and 37a both axially fix the ring 38 and compress the ring within a groove 39 formed in the shaft 32. Preferably, the shaft 32 has a conically formed end 32a which facilitates backing up the tractor and running the drawbar socket 25a over the shaft 32. As a result of this construction, the implement tongue 13 is secured in rigid alinement with the drawbar 25, that is, the tongue and the drawbar swing in unison up and down and from side to side. However, the shaft 32 can freely rotate within the socket 25a and hence lateral tilting movement of the implement relative to the tractor is readily accommodated.

The frame 26 is of box-like construction defining a main transverse beam portion 40 having side arms 41 extending forwardly and being pivoted on bolts 41a secured in the brackets 27. The frame 26 thus swings up and down about the same transverse axis 30 as does the drawbar 25. The frame 26 also defines an arcuate, channeled track 42 having its axis substantially coinciding with the axis of the drawbar pivot bolt 31. Riding in the track 42 is a follower in the form of a pair of rollers 43 journalled on a bracket 44 secured to the drawbar 25. There is thus a lifting connection between the frame 26 and the drawbar 25, with the frame and drawbar swinging together about the transverse axis 30. The arcuate conformation of the track 42 and the rollers 43 allow the drawbar 25 to swing freely about the pivot bolt 31 from side to side.

Under certain circumstances, it is desirable to limit the sidewise swinging movement of the drawbar 25. For this purpose, a pair of stops 45 are provided for bolting to the track 42.

To couple the frame 26 and the lift arms 18, a pair of drop links 46 of conventional type are extended one from each of the lift arms 18 to the opposite ends of the frame beam portion 40. Admitting hydraulic fluid under pressure to the actuators 20 so as to extend the actuators thus tends to rock the lift arms 18 upwardly so as to exert a lifting force through the drop links 46 to the frame 26 which has the effect of exerting a lifting force on the drawbar 25 and the rigidly connected implement tongue 13. This lifting force effects a weight transfer from the implement to the rear tractor drive wheels in the manner and for the purposes which will be familiar to those skilled in this art. It will be appreciated that this lifting force, i.e., the amount of weight transfer, remains constant as the drawbar 25 pivots from side to side.

The brackets 27 are positioned so that the axes for the drawbar 25, that is the axis 30 and the axis defined by the pivot bolt 31, cross just beneath and at the approximate center of the axis for the rear drive wheels 16 of the tractor. By positioning the pivot bolt axis 31 close to the drive wheel axis, a close coupling is achieved between the tractor and the implement so that the implement tracks quite closely behind the tractor. This close coupling also tends to minimize the sidewise moment which could affect tractor steering when sharp turns are made. Thus, even with high drawbar and weight transfer loadings, turns with the attachment 12 do not adversely affect the steering characteristics of the tractor.

In the illustrated embodiment, the hydraulic lift actuators 20 are pivoted on the brackets 27 as are a pair of conventional draft links 50. Thus, the brackets 27, solidly bolted to the tractor frame, bear all of the pulling loads exerted on the tractor and can be appropriately designed for that purpose. When the drawbar attachment 12 is in use, the draft links 50 are held up out of the way by a bar 51 which is notched to receive the two links 50 and is centrally pinned to a top link clevis 52 forming a conventional part of the tractor hitch linkage. The draft links 50 are formed with holes 53 by which the drop links 46 can be secured thereto (see FIG. 6) when conventional implement mounting on the tractor 10 is desired.

When not in use, the frame 26 is swung to a forwardly extending position underlying the tractor body, shown in FIG. 6, where a latch 55 engages and holds the frame in this stored position. The latch 55 includes a notched finger 56 pivoted on a bracket 57 secured to the tractor body 15 and having an upstanding tab 58 which receives the force of one end of a torsion spring 59 urging the latch finger 56 in a counterclockwise direction, as seen in FIG. 4. A release link 60 is provided enabling the tractor operator to pull the latch finger 56 clockwise so as to free the frame 26. A cam surface 61 on the lower end of the latch finger 56 allows the frame to be simply swung upwardly and snapped into its latched, stored position. It will be understood that the drawbar pin 31 is removed to release the drawbar 25 prior to swinging the frame 26 into its forwardly extending storage position.

In addition to the features and advantages discussed above in connection with the description of the attachment 12, those skilled in this art will appreciate that the attachment is a rugged construction well suited for economical mass manufacture and capable of long service life under the conditions which equipment of this type must be expected to encounter.

I claim as my invention:

1. An attachment for coupling the tongue of a ground supported unit to the body of a tractor having a powered lift arm comprising, in combination, a drawbar pivoted on said tractor body for up and down swinging movement about one axis and side-to-side swinging movement about a second axis, means for securing said tongue to said drawbar in rigid alinement, a frame defining an arcuate track pivoted on said body for swinging movement about said one axis with said arcuate track being positioned so that its axis substantially coincides with said second axis, a follower secured to said drawbar and riding on said track so as to provide a lifting connection between said frame and said drawbar, and a drop link connecting said link arm to said frame so that powering the lift arms tends to raise said tongue about said one axis.

2. The combination of claim 1 in which said tractor has rear drive wheels and said one and said second axes are positioned to cross one another just below and at the approximate center of the axis for said drive wheels.

3. The combination of claim 1 in which said one axis is positioned beneath said tractor body so that said frame can swing about said one axis to a forwardly extending position underlying the body, and the combination including a latch for releasably holding said frame in said forwardly extending position.

4. The combination of claim 1 in which said means permits relative rotation between said tongue and said drawbar so as to accommodate lateral tilting of the unit relative to the tractor.

5. An attachment for coupling the tongue of a ground supported unit to the body of a tractor having a pair of powered lift arms comprising, in combination, a drawbar pivoted on said tractor body for up and down swinging movement about one axis and side-to-side swinging movement about a second axis, means for securing in rigid alinement said tongue to said drawbar, a box-like frame defining a transverse beam with an arcuate track, said frame being pivoted on said body for swinging movement about said one axis with said arcuate track being positioned so that its axis substantially coincides with said second axis, a follower secured to said drawbar and riding on said track so as to provide a lifting connection between said frame and said drawbar, and a pair of drop links respectively coupling said lift arms to the opposite ends of said beam.

6. A tractor-trailing unit combination comprising, a pair of laterally spaced brackets fixed to the underside of said tractor, a cross piece pivoted between said brackets for rotation about a transverse axis, a drawbar pivoted on said cross piece for side-to-side swinging movement, a frame pivoted on said brackets for swinging movement about said transverse axis, said frame defining a channeled arcuate track having its axis substantially coinciding with the pivot point of said drawbar, a follower secured to said drawbar and riding in said track so that the frame and drawbar swing vertically together about said transverse axis, said tractor having powered lift arms, and drop links coupling said lift arms and said frame.

7. The combination of claim 6 including a pair of draft links pivoted respectively on said pair of brackets, and a bar secured to said tractor and engaging said draft links so as to hold the draft links up and away from said frame.

8. The combination of claim 6 in which said powered lift arms are selectively lifted by hydraulic actuators extended between respective ones of said arms and said brackets.

References Cited by the Examiner

UNITED STATES PATENTS

| | | | |
|---|---|---|---|
| 1,785,124 | 12/1930 | Jett | 280—492 |
| 1,899,343 | 2/1933 | Mackey et al. | 287—135 |
| 2,462,726 | 2/1949 | Currie | 280—499 |
| 2,473,357 | 6/1949 | Blunier | 280—490 X |
| 2,503,096 | 4/1950 | Carlson | 280—490 |
| 2,620,718 | 12/1952 | Oerman | 280—490 |
| 2,780,479 | 2/1957 | Frieberg | 280—499 X |
| 2,871,030 | 1/1959 | Hollis | 280—492 |
| 3,065,977 | 11/1962 | Virtue et al. | 280—460 |

FOREIGN PATENTS

| | | |
|---|---|---|
| 115,199 | 10/1945 | Sweden. |
| 156,503 | 10/1956 | Sweden. |

LEO FRIAGLIA, *Primary Examiner.*

R. C. PODWIL, *Assistant Examiner.*